G. KEEBLE.

Stop Mechanism for Paper Feeding and Cutting Machines.

No. 9,262. Reissued June 22, 1880.

Witnesses

E. G. Rice.

Lizzie C. Rice.

Inventor

George Keeble

UNITED STATES PATENT OFFICE.

GEORGE KEEBLE, OF LOWELL, MASSACHUSETTS.

STOP MECHANISM FOR PAPER FEEDING AND CUTTING MACHINES.

SPECIFICATION forming part of Reissued Letters Patent No. 9,262, dated June 22, 1880.

Original No. 58,563, dated October 2, 1866. Application for reissue filed April 8, 1880.

*To all whom it may concern:*

Be it known that I, GEORGE KEEBLE, of Lowell, county of Middlesex, and State of Massachusetts, formerly a resident of Brundish, county of Suffolk, and Kingdom of Great Britain, have invented a new and useful Improvement in Stop-Cutters for Paper-Mills, of which the following is a specification.

My invention relates to machines which are used to cut continuous sheets of paper into shorter sheets for reams or bundles.

The object of my invention is to provide a stop-motion certain, quick and positive in its action, and one that shall be easy of adjustment and of great durability. I attain this object by the mechanism illustrated in the accompanying drawings, in which similar letters of reference indicate like parts.

Figure 1:
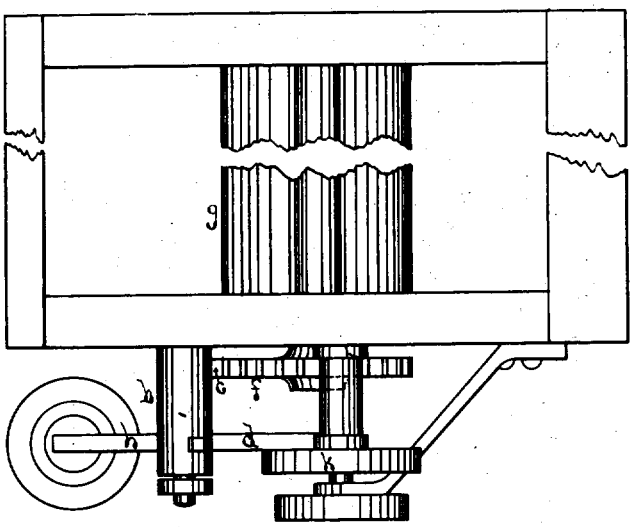
Figure 3:
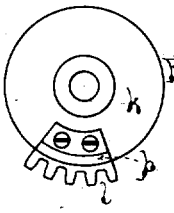
Figure 4:
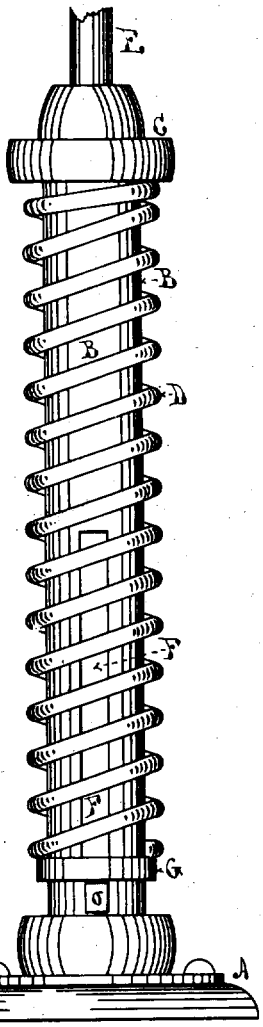
Figure 2:
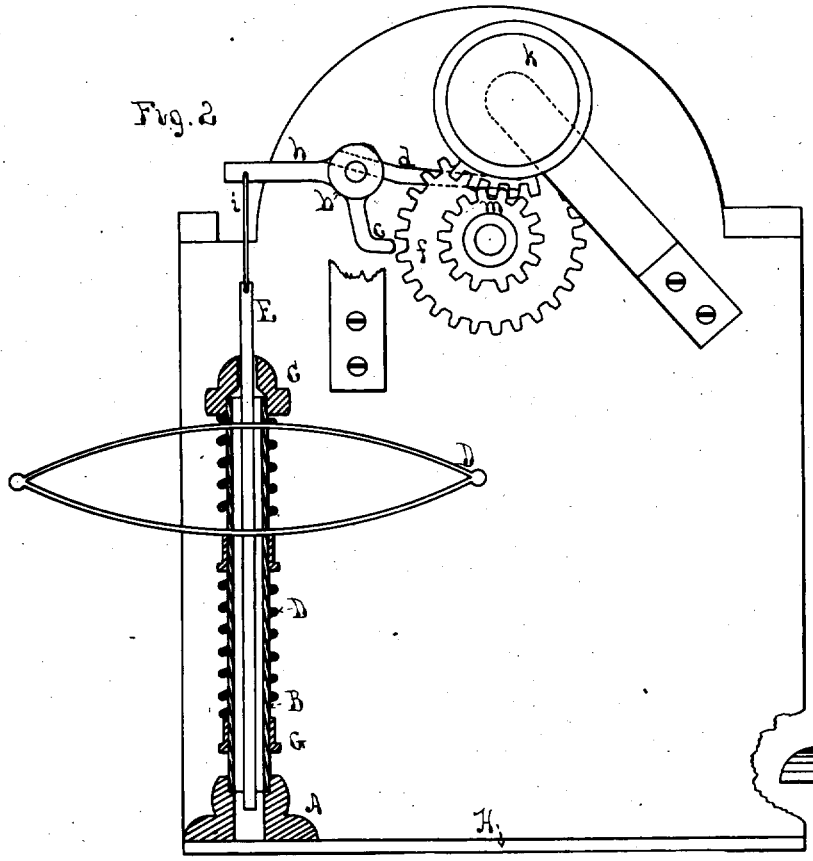

Figure 1 is a top-plan view. Fig. 2 is an end elevation of an ordinary stop-cutter for paper-mills with my improvement as applied thereto, partly in section. Fig. 3 is a reverse view of wheel *k* of Fig. 1. Fig. 4 is a side elevation of a part of my improvement, considerably larger than that shown in section in Fig. 2.

In the ordinary stop-cutter for paper-mills the continuous sheet of paper is moved forward by the drum *g*, and when the proper length has passed under the cutter the drum stops until the cutter cuts off the sheet. This intermittent action is produced by the wheel *k*, which is driven with a continuous motion by the other machinery of the mill, and is provided with the flange or cam *p* and the segment *l*, which engages with the pinion *m*, which is attached to the shaft of the drum *g*, upon which is also placed the wheel *f*, having teeth in its periphery, into which there engages the dog *c*, having an end made to fit between the teeth. This dog is placed on a rock-shaft, *b*, to which is also attached an arm, *d*, whose position in relation to the dog is such that when the arm is depressed the dog is taken out of engagement with the teeth of wheel *f*, and its position in relation to the segment *l* and flange *p* is such that just before the segment *l* comes into engagement with the pinion *m* the flange *p* will depress the arm *d*, and as soon as the last tooth of the segment has cleared itself of the pinion the flange *p* releases the arm *d*, and the rock-shaft and dog are free to move, so that the dog will return into engagement with the teeth of wheel *f*. This return has been commonly effected prior to this my invention by the use of a flat spring secured to some portion of the frame and extending along beneath the arm *d*, with its end in contact with the arm, so that when the arm was depressed the increased tension of the spring would, as soon as it was released from contact with the flange, throw it upward, and thus move the rock-shaft and dog. This method is objectionable, however, for the reason that the tension of the spring cannot be readily adjusted, and as the end comes in contact with the arm the friction of the parts, together with the fact of its short arc of movement, requires a spring of great stiffness and consequently of little sensitiveness and of limited durability.

In order to avoid this objectionable construction and attain the object of my invention I dispense with the spring attached and operating as described, or any spring operating directly against the arm *d* or dog *c*, and attach to the rock-shaft *b* the arm or lever *h*, which is extended from the rock-shaft on substantially the opposite side from the arm *d*. Attached to this arm and below it is the spring D, connected with the lever *h* by the rod E and strap or link *i*.

B is a tube, in which the rod E moves up and down. This tube is attached to the stand A, which is fastened to the floor under the end of the lever *h*, and is provided a part of its length with a slot, F, through which a key, *o*, can be inserted in a hole near the end of rod E. On top of this key I place a collar, G, and attached to the top of the tube the cap C. Between the cap and the collar I place the spring D, which, pressing down upon the collar, acts upon the rod, and through it upon the lever *h*. The tube B serves the purpose of a guide to prevent the spring D from twisting, knuckling, or throwing its middle portion out of line with the rod E, and thus permits the use of a long spring, or one acting through a great distance, and consequently one requiring lighter tension and of greater sensitiveness; and as the lever *h* can be made as long as desired without interfering with the other mechanism, the strap *i* can be attached at such a distance from the rock-shaft as will permit the use of such spring. As the spring has no direct bearing on the arm *d*, all friction between the spring and other parts is avoided. Besides this, the weight of the lever *h* and rod E, balancing the weight of the arm *d* and dog *c*, or a little overbalancing it, leaves the spring only the inertia of the parts to overcome and greatly assists in the quick engagement of the dog *c* with the wheel *f*, on which depends the accuracy with which the sheets are cut, because if the dog fails to quickly engage with the wheel the momentum of the drum will carry forward under the cutter a greater length of the continuous sheet.

Besides these advantages the tension of the spring can be altered by the operator, without the use of tools, by shortening up the strap *i* by means of its buckle, and when it is desired to disconnect the spring, so that the machine can be used on rolls instead of sheets, it can be readily done by disengaging the same.

Instead of a spiral spring I sometimes use an elliptic or flat spring, which may be applied to the tube B, and operated in substantially the same manner as the spiral spring, as shown in Fig. 2.

It will be observed that in place of the old unbalanced mechanism, difficult to adjust and operating in opposition to well-known natural laws, and of inconvenient arrangement, I have substituted a well-balanced though simple device, which can be readily adjusted to answer the different requirements which the machine is called upon to meet.

What I claim as new and of my invention is—

1. The combination of the drive-wheel *k*, provided with the cam *p* and segment *l*, which engages with the pinion *m*, the wheel *f*, and rock-shaft *b*, provided with the arm *d*, dog *c*, and lever *h*, to which is connected the spring D, substantially as described.

2. The combination, in a stop-cutter for paper-mills, of a rock-shaft provided with a dog and an arm, of a spring, lever, and connecting devices, substantially as described.

3. In combination, in a stop-cutter, the drum *g*, wheel *f*, wheel *m*, wheel *k*, provided with the segment *l*, rock-shaft *b*, provided with the arm *d*, dog *c*, and balance-lever *h*, the spring D, strap *i*, and tube B, substantially as described.

GEORGE KEEBLE.

Witnesses:
LEPINE C. RICE,
E. G. RICE.